Patented Sept. 21, 1943

2,329,704

UNITED STATES PATENT OFFICE 2,329,704

RIPENED CELLULOSE ESTERS

Camille Dreyfus, New York, N. Y., and Robert D. Rowley, Cumberland, Md., assignors to Celanese Corporation of America, a corporation of Delaware No Drawing. Application July 3, 1942,
Serial No. 449,591

8 Claims. (Cl. 260—230)

This invention relates to improvements in the production of organic esters of cellulose, and relates more particularly to the production of cellulose acetate or other cellulose esters, particularly the lower fatty acid esters of cellulose.

An object of our invention is the production of organic esters of cellulose of improved stability.

Another object of our invention is the production of organic esters of cellulose which are particularly adapted for use in molding operations.

Other objects of our invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent, or solvent, for the ester of cellulose being formed. The esterified cellulose is obtained in the form of a viscous, homogeneous solution in the organic acid diluent, to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed with water to free it of acids as much as is possible.

In the preparation of cellulose acetate in accordance with the above process, the cellulose, with or without a pretreatment with organic acids or organic acids containing some sulfuric acid, is usually acetylated by treatment with acetic anhydride and a catalyst, such as sulfuric acid, in the presence of glacial acetic acid as a solvent for the cellulose acetate formed. The sulfuric acid catalyst is normally present in amounts of from 9 to 15%, or even 20%, on the weight of the cellulose. Part of this sulfuric acid may be introduced in the pretreatment which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid is permitted to stand until the desired solubility characteristics are reached. During this standing or ripening period, not only are acetyl groups split off, but in addition combined sulfuric acid is split off. When the desired solubility characteristics are reached, further ripening is halted and the mixture is treated with a large excess of water or other non-solvent to precipitate the cellulose acetate. The precipitated cellulose acetate is washed with water to remove as much acid and other non-cellulose ester materials as possible and is then subjected to a stabilizing treatment, usually by heating it in suspension in very dilute sulfuric acid, with the object of still further reducing its content of combined sulfuric acid. The latter imparts a tendency to the cellulose acetate to decompose, degrade and/or discolor. The degree of stability is measured by the degree of acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the acetylation may take from 1½ to 7 hours and the ripening from 20 to 45 or 50 hours, while the stabilizing treatment may take from 3 to 6 hours to achieve the desired stability in the product. Not only does this process consume an excessive amount of time due to the necessary stabilization treatment, but the necessity for a stabilizing treatment limits productive capacity. In addition, the stabilization treatment consumes substantial amounts of sulfuric acid and thus adds to the cost of production.

Moreover, while the cellulose acetate produced in the manner described may be sufficiently stable so that it may be employed satisfactorily for the preparation of yarn and other textile materials, the cellulose acetate thus produced often fails to possess sufficient stability when subjected to molding operations. This lack of stability is apparent from the substantial loss of viscosity suffered by the cellulose acetate when molded.

We have now discovered that cellulose acetate, as well as other organic esters of cellulose, of excellent stability characteristics may be prepared without requiring any stabilization treatment. This desirable result may be achieved if, after an acetylation reaction, as described, the acid catalyst employed for the acetylation reaction is neutralized by the addition of suitable neutralizing agents and the cellulose acetate in the resulting solution is ripened at an elevated temperature to the desired solubility characteristics in stages, water for ripening being added in each of said stages.

In accordance with the process of our invention, the neutralizing agent may be added in an amount sufficient to neutralize all of the acid catalyst present and water for ripening is added in an amount of from 20 to 100% on the weight of the original cellulose. Ripening is conducted at a temperature of about 60 to 120° C. for from 2 to 30 hours, preferably to the point when the cellulose acetate is soluble in hot chloroform, and further water for ripening may be added at this point. The second water addition may be from 50 to 180% on the weight of the cellulose. Ripening is continued at a temperature of 60 to 120° C. or more until the desired solubility characteristics are reached, and the cellulose acetate may then be precipitated, washed and dried. When ripening at temperatures in excess of about 100° C. or at the boil, we may employ a closed vessel under slight pressure or provide a reflux condenser to return condensed vapors to the vessel.

Alternatively, the neutralizing agent may be added in an amount sufficient to neutralize only a part of the acid catalyst, and the cellulose acetate ripened for a short time before the remainder of the catalyst is neutralized and the ripening continued. When ripening in this way, the neutralizing agent may be added in an amount sufficient to neutralize from 50 to 95% of the catalyst, from 20 to 50% of water for ripening on the weight of the cellulose added, and ripening conducted at 40 to 90° C. for from 2 to 8 hours. The remaining catalyst is neutralized, from 20 to 80% of water is added, and ripening is continued at a temperature of 60 to 120° C. for 2 to 20 hours, preferably to a point where the cellulose acetate is soluble in hot chloroform. Further water is added in an amount of from 20 to 130% on the cellulose, and ripening is continued at from 60 to 120° C. until the desired solubility characteristics are reached. The cellulose acetate may then be precipitated, washed and dried.

The water for ripening may be added as such or, advantageously, may be added in the form of a dilute solution of acetic acid to avoid any substantial precipitation of the cellulose acetate. The neutralizing agent may be added together with the water for ripening, particularly if the latter is added in the form of a dilute solution of acetic acid, or in solution in glacial acetic acid, or it may be added separately in powder form.

The neutralizing agent employed may be a salt of magnesium or calcium, such as, for example, magnesium acetate, calcium acetate, magnesium carbonate or calcium carbonate. Zinc acetate, zinc oxide or the oxides, carbonates, or hydroxides of aluminum, barium, copper, lithium and strontium, as well as organic acid salts of these metals may also be employed as the neutralizing agent. Mixture of any two or more of the foregoing compounds may be used. The neutralizing agent preferably employed in accordance with this invention comprises a mixture of magnesium acetate and calcium acetate.

Prior to acetylation the cellulose may, for example, be pretreated with acetic acid or formic acid, or a mixture of these acids, in order to render it more reactive. The acids may be present in a small amount, say, for example, from 1 to 50% on the weight of the cellulose, or in much larger quantities, for example, on the order of 100%, 200% or even 300% on the weight of the cellulose, and may contain a small quantity of sulfuric acid, for instance, ½ to 1 or 2% on the weight of the cellulose. The pretreatment is preferably allowed to go on for some hours, for example, overnight, though much shorter periods produce the desired results when sulfuric acid is present. The pretreated cellulose is then treated with acetic anhydride and sulfuric acid in appropriate amount to bring about acetylation.

The cellulosic materials esterified in accordance with our process may be any suitable form of cellulose or cellulose derivative. It may be cotton, cotton linters, wood pulp, regenerated cellulose, or other cellulosic material obtainable from various other sources such as grasses, straws, hulls and the like.

In order further to illustrate our invention but without being limited thereto the following examples are given.

Example I 385 parts by weight of cotton are pretreated with a mixture of 5.7 parts of sulfuric acid, 5.7 parts of water and 400 parts of acetic acid for 6 hours. After pretreatment the cotton is entered into an acetylizer containing 975 parts of acetic anhydride, 1900 parts of acetic acid and 40 parts of sulfuric acid. The time of acetylation is 5 hours and a peak temperature of 27° C. is reached. After acetylation is completed, water is added in an amount only sufficient to react with any excess acetic anhydride.

There is then added to the acetylation mixture sufficient neutralizing agent to neutralize all of the sulfuric acid present, and water is added with the neutralizing agent in an amount equal to 60% on the weight of the cotton. The neutralizing agent employed comprises a mixture of magnesium acetate and calcium acetate obtained by reacting calcined dolomite in dilute acetic acid to form said acetates, the resulting clear aqueous solution being employed as the neutralizing agent. The acetylation mixture is heated to 83° C. and ripened at this temperature for 21½ hours. At this point a second addition of water is made in an amount equal to 90% on the weight of the cotton, making a total water addition of 150%. Ripening is continued at 85° C. for 25 hours at which time the cellulose acetate has an acetyl value of 54.6%, calculated as acetic acid. The cellulose acetate is precipitated from solution by the addition of a large amount of water. The cellulose acetate obtained has a high degree of stability and may be molded satisfactorily without any stabilizing treatment.

Example II

Cotton is acetylated in the manner described in Example I.

After free acetic anhydride is destroyed by the addition of water, sufficient neutralizing agent, prepared as in Example I, is added to the acetylation mixture to neutralize 50% of the sulfuric acid present and water for ripening is added with the neutralizing agent in an amount equal to 30% on the weight of the cotton. The cellulose acetate is ripened for 3 hours at an average temperature of 50° C. At this point, the remaining 50% of the sulfuric acid is neutralized and a water addition of 30% on the cotton is made. Ripening is continued for 22½ hours at a temperature of 93° C. and then a further water addition is made equal to 90% on the weight of the cotton. The cellulose acetate is ripened for 16¾ hours more at 88° C., at which time the cellulose acetate has an acetyl value of 54.0% calculated as acetic acid. The cellulose acetate is then precipitated, washed and dried. The resulting cellulose acetate is of a high degree of stability and may be molded with little or no viscosity loss.

While our invention is particularly described in connection with the acetylation of cellulose employing sulfuric acid as catalyst, other catalysts may be used as well, such as phosphoric acid, or mixtures of phosphoric acid and sulfuric acid. Preferably, we employ sulfuric acid alone without any other mineral acid present during the acetylation. In a similar way, employing the proper esterifying agent or agents, other cellulose esters may be prepared, for example, the cellulose esters of propionic, butyric or similar acid, or mixed esters, for example, cellulose acetate-propionate or cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. Process for the production of organic acid esters of cellulose of improved characteristics, which comprises esterifying cellulose by means of a lower fatty acid anhydride in the presence of an inorganic acid catalyst selected from the group consisting of sulfuric acid and phosphoric acid, neutralizing the catalyst present, adding water and ripening the lower fatty acid ester of cellulose produced to the desired solubility characteristics in a plurality of stages, the catalyst being neutralized by the addition of neutralizing agents selected from the group consisting of magnesium, calcium, zinc and aluminum compounds, and at least one stage of the ripening being effected in the absence of catalyst.

2. Process for the production of cellulose acetate of improved characteristics, which comprises acetylating cellulose by means of acetic anhydride in the presence of acetic acid as solvent and sulfuric acid as catalyst, neutralizing the catalyst present, adding water and ripening the cellulose acetate produced to the desired solubility characteristics in a plurality of stages, the catalyst being neutralized by the addition of neutralizing agents selected from the group consisting of magnesium, calcium, zinc and aluminum compounds, and at least one stage of the ripening being effected in the absence of catalyst.

3. Process for the production of organic acid esters of cellulose of improved characteristics, which comprises esterifying cellulose by means of a lower fatty acid anhydride in the presence of an inorganic acid catalyst selected from the group consisting of sulfuric acid and phosphoric acid, adding a neutralizing agent selected from the group consisting of magnesium, calcium, zinc and aluminum compounds in an amount sufficient to neutralize a portion of the catalyst present, adding water and ripening the lower fatty acid ester of cellulose produced, adding neutralizing agent in an amount sufficient to neutralize the remainder of the catalyst present, adding more water and ripening the lower fatty acid ester of cellulose to the desired solubility characteristics.

4. Process for the production of cellulose acetate of improved characteristics, which comprises acetylating cellulose by means of acetic anhydride in the presence of acetic acid as solvent and sulfuric acid as catalyst, adding a neutralizing agent selected from the group consisting of magnesium, calcium, zinc and aluminum compounds in an amount sufficient to neutralize a portion of the sulfuric acid present, adding water and ripening the cellulose acetate produced, adding neutralizing agent in an amount sufficient to neutralize the remainder of the sulfuric acid present, adding more water and ripening the cellulose acetate to the desired solubility characteristics.

5. Process for the production of cellulose acetate of improved characteristics, which comprises acetylating cellulose by means of acetic anhydride in the presence of acetic acid as solvent and sulfuric acid as catalyst, neutralizing the sulfuric acid present, adding from 20 to 100%, based on the weight of the cellulose originally present, of water, allowing the cellulose acetate to ripen, adding from 50 to 180%, based on the weight of the cellulose originally present, of additional water and allowing the cellulose acetate to ripen to the desired solubility characteristics, the sulfuric acid being neutralized by the addition of neutralizing agent selected from the group consisting of magnesium, calcium, zinc and aluminum compounds, and at least one stage of the ripening being effected in the absence of catalyst.

6. Process for the production of cellulose acetate of improved characteristics, which comprises acetylating cellulose by means of acetic anhydride in the presence of acetic acid as solvent and from 9 to 20%, based on the weight of the cellulose, of sulfuric acid as catalyst, adding neutralizing agent selected from the group consisting of magnesium, calcium, zinc and aluminum compounds in an amount sufficient to neutralize from 50 to 95% of the sulfuric acid, adding from 20 to 50%, based on the weight of the cellulose originally present, of water, allowing the cellulose acetate produced to ripen, adding a neutralizing agent in an amount sufficient to neutralize the remainder of the sulfuric acid present, adding from 20 to 80% of additional water, allowing the cellulose acetate to ripen, and then adding from 20 to 130% of additional water and allowing the cellulose acetate to ripen to the desired solubility characteristics.

7. Process for the production of cellulose acetate of improved characteristics, which comprises acetylating cellulose by means of acetic anhydride in the presence of acetic acid as solvent and sulfuric acid as catalyst, neutralizing the sulfuric acid present, adding 60%, based on the weight of the cellulose originally present, of water, allowing the cellulose acetate to ripen at a temperature of 83° C. until the cellulose acetate produced is soluble in hot chloroform, and then adding 90% of additional water and allowing the cellulose acetate to ripen at a temperature of 85° C. to the desired solubility characteristics, the sulfuric acid being neutralized by the addition of neutralizing agent comprising a mixture of magnesium acetate and calcium acetate, and at least one stage of the ripening being effected in the absence of catalyst.

8. Process for the production of cellulose acetate of improved characteristics, which comprises acetylating cellulose by means of acetic anhydride in the presence of acetic acid as solvent and about 15%, based on the weight of the cellulose, of sulfuric acid as catalyst, adding a neutralizing agent comprising a mixture of magnesium acetate and calcium acetate in an amount sufficient to neutralize 50% of the sulfuric acid, adding 30%, based on the weight of the cellulose originally present, of water and ripening the cellulose acetate produced at an average temperature of 50° C., adding additional neutralizing agent in an amount sufficient to neutralize the remainder of the sulfuric acid present, adding an additional 30% of water, ripening the cellulose acetate at a temperature of 93° C. until the cellulose acetate produced is soluble in hot chloroform, and then adding an additional 90% of water and ripening the cellulose acetate at a temperature of 88° C. to the desired solubility characteristics.

CAMILLE DREYFUS.
ROBERT D. ROWLEY.